United States Patent [19]

Dill et al.

[11] Patent Number: 4,667,305

[45] Date of Patent: May 19, 1987

[54] CIRCUITS FOR ACCESSING A VARIABLE WIDTH DATA BUS WITH A VARIABLE WIDTH DATA FIELD

[75] Inventors: Frederick H. Dill, South Salem; Daniel T. Ling; Richard E. Matick, both of Peekskill; Dennis J. McBride, Shrub Oak, all of N.Y.

[73] Assignee: International Business Machines Corporation, Armonk, N.Y.

[21] Appl. No.: 394,044

[22] Filed: Jun. 30, 1982

[51] Int. Cl.[4] .................................................. G06F 13/00
[52] U.S. Cl. ........................................ 364/900; 340/799
[58] Field of Search ........ 364/200, 900, 200 MS File, 364/ 900 MS File, 521; 365/230, 63

[56] References Cited

U.S. PATENT DOCUMENTS

| | | | |
|---|---|---|---|
| 3,500,466 | 3/1970 | Carleton | 340/172.5 |
| 3,571,803 | 3/1971 | Huttenhoff et al. | 364/900 |
| 3,665,409 | 5/1972 | Miller et al. | 340/172.5 |
| 3,680,058 | 7/1972 | DeSantis et al. | 364/200 |
| 3,739,352 | 6/1973 | Packard | 364/200 |
| 3,781,812 | 12/1973 | Wymore et al. | 364/200 |
| 3,949,375 | 4/1976 | Ciarlo | 340/172.5 |
| 3,969,704 | 7/1976 | Liebel, Jr. | 364/900 |
| 4,004,283 | 1/1977 | Bennett et al. | 340/172.5 |
| 4,021,655 | 5/1977 | Healey et al. | 364/749 |
| 4,023,023 | 5/1977 | Bourrez et al. | 364/736 |
| 4,034,346 | 7/1977 | Hostein | 364/900 |
| 4,057,846 | 11/1977 | Cockerill et al. | 364/200 |
| 4,070,710 | 6/1978 | Sukonich et al. | 364/900 |
| 4,075,691 | 2/1978 | Davis et al. | 364/200 |
| 4,079,452 | 3/1978 | Larson et al. | 364/200 |
| 4,109,310 | 8/1978 | England et al. | 364/200 |
| 4,115,856 | 9/1978 | Labeye-Voisin et al. | 364/200 |
| 4,126,897 | 11/1978 | Capowski et al. | |
| 4,128,883 | 12/1978 | Duke et al. | 364/200 |
| 4,133,030 | 12/1978 | Duke et al. | 364/200 |
| 4,135,242 | 1/1979 | Ward et al. | 364/200 |
| 4,159,534 | 6/1979 | Getson et al. | 364/200 |
| 4,174,536 | 11/1979 | Minunas et al. | 364/200 |
| 4,205,373 | 5/1980 | Shah et al. | 364/200 |
| 4,219,874 | 8/1980 | Gusev et al. | 364/200 |
| 4,224,676 | 9/1980 | Appelt | 364/712 |
| 4,258,419 | 3/1981 | Blahut et al. | 364/200 |
| 4,271,480 | 6/1981 | Vinot | 364/900 |
| 4,287,563 | 9/1981 | Huston | 364/200 |
| 4,309,754 | 1/1982 | Dinwiddie | 364/200 |
| 4,435,792 | 3/1984 | Bechtolsheim | 365/230 |
| 4,467,443 | 8/1984 | Shima | 364/900 |

Primary Examiner—Gareth D. Shaw
Assistant Examiner—Jonathan C. Fairbanks
Attorney, Agent, or Firm—John J. Goodwin

[57] ABSTRACT

A general bit manipulator structure for parallel accessing a variable width data bus wherein, with a data bus of variable width $N_c$ and a data field of $N_f$, the structure can place the data field on the data bus with bit 1 of the data field aligned with a selected bit n within the data bus width. If the data field $N_f$ extends beyond the end of the data bus, the overflow bits of the data field are "wrapped around" and placed at the beginning of the data bus starting at position 1 of the data bus. Also, special signals are generated and accompany these overflow or wrapped bits. Furthermore, select signals are generated to indicate which bits of the data bus contain valid data when the width of the data field is less than the width of the data bus. The structure includes a modulo $N_c$ combinational ring shifter for aligning the data field with the data bus. An overflow signal generator is provided using a subtraction circuit wherein the data field width is subtracted from the data bus width between alignment bit n and the end bit $N_c$. A negative subtraction result indicates overflow and the magnitude of the result specifies the bit positions from bit 1 of the data bus for the wrapped around bits. A select signal generator including two decoders is provided to indicate the valid data bit positions of the data bus.

5 Claims, 16 Drawing Figures

| FIG. 4.1 | FIG. 4.2 | FIG. 4.3 | FIG. 4.4 | FIGS. 4.5, 5 |

CIRCUITS FOR ACCESSING A VARIABLE WIDTH DATA BUS WITH A VARIABLE WIDTH DATA FIELD

BACKGROUND OF THE INVENTION

1. Field of the Invention

This invention relates to logic circuits for the transmission of data signals between components in a computer system, and more particularly to circuits for accessing a variable width data bus with a variable width data field and aligning the field on the bus.

2. Description of the Prior Art

There is a large segment of the data processing prior art directed to the transmission of data in fields or blocks, via parallel channels and busses, between processors, storage units, buffers, display terminals, input/output devices and the like. Problems occur in the prior art structures in techniques involving in bus steering and, different data formats (i.e , data widths and parallel interfacing.)

Some examples of typical prior art references in this environment include U.S. Pat. No. 4,126,897 entitled "Request Forwarding System," issued Nov. 21, 1978 to Capowski et al which describes a system wherein requests are forwarded from plural input/output channels to shared main storage. Variation in word widths are identified by tags such that "EOT" represents a "1-wide" request and a "QW" tag represents a "4-wide" request.

In U.S. Pat. No. 4,057,846 entitled "Bus Steering Structure For Low Cost Pipelined Processor Systems," issued Nov. 8, 1977 to Cockerill et al, a system is described including logic circuitry which provides a control function to steer data over the proper bus structures for interconnecting the processor, the memory and the input/output devices. No variable word problems are involved.

Likewise, Misunas et al (U.S. Pat. No. 4,174,536) discloses a system with a message routing switch wherein serial and parallel interfaces are associated with input/output ports. Davis et al (U.S. Pat. No. 4,075,691) and Larson et al (U.S. Pat. No. 4,079,452) show control systems using serial interface adapters and parallel interface adapters. Labeye-Voisin et al (U.S. Pat. No. 4,115,856) and Hostein (U.S. Pat. No. 4,034,346) show interfaces using parallel to serial conversion.

U.S. Pat. No. 4,159,534 (Gelson, Jr. et al), U.S. Pat. No. 4,070,710 (Sukonich et al), U.S. Pat. No. 4,004,283 (Bennett et al), U.S. Pat. No. 4,133,030 (Huettner et al), U.S. Pat. No. 4,205,373 (Shah et al) and U.S. Pat. No. 4,128,883 (Duke et al) show systems using device, channel and interface adapters for coupling to a bus.

In U.S. Pat. No. 3,949,375 (Ciarlo) a pair of 16-bit registers couple on a I/O bus to various display devices. In U.S. Pat. No. 3,500,466 (Carleton), a multiplexor is shown which couples different data sets through bit buffers to a common multi-line bus, and in U.S. Pat. No. 3,665,409 (Miller et al) a signal translator is shown for "skewing" or shifting data.

None of the prior art references provides a system for interfacing between a variable width data bus and a variable width data field by the "wrapping around" of "overflow" bits as is provided in the present invention.

SUMMARY OF THE INVENTION

An object of the present invention is to provide means for accessing in parallel a data bus of variable width and of aligning a data field, also of variable width, on the data bus. A further object of the present invention is to provide means for aligning the first bit of the variable width data field with a selected bit within the data bus.

Still another object of the present invention is to provide means for aligning the first bit of a data field with a selected bit within a data bus, and, if the end of the data field extends beyond the end of the data bus, to further interface the overflow data field bits with the data bus.

A feature of the present invention is the provision of a general bit manipulator structure for parallel accessing a variable width data bus wherein, with a data bus of variable width $N_c$ and a data field of $N_f$, the structure can place the data field on the data bus with bit 1 of the data field aligned with a selected bit n within the data bus width. If the data field $N_f$ extends beyond the end of the data bus, the overflow bits of the data field are "wrapped around" and placed at the beginning of the data bus starting at position 1 of the data bus. Also, special signals are generated and accompany these overflow or wrapped bits. Furthermore, select signals are generated to indicate which bits of the data bus contain valid data when the width of the data field is less than the width of the data bus.

The structure includes a modulo $N_c$ combinational ring shifter for aligning the data field with the data bus. An overflow signal generator is provided using a subtraction circuit wherein the data field width is subtracted from the data bus width between alignment bit n and the end bit $N_c$. A negative subtraction result indicates overflow and the magnitude of the result specifies the bit positions from bit 1 of the data bus for the wrapped around bits. A select signal generator including two decoders is provided to indicate the valid data bit positions of the data bus.

BRIEF DESCRIPTION OF THE DRAWINGS

FIGS. 3.1 and 3.2 is a schematic block diagram of a display system incorporating the general bit manipulator structure and techniques of the present invention.

FIGS. 4.1 and 4.5 and 5 are schematic diagrams of a modulo $N_c$ combinational ring shifter used for aligning a variable width data bus with a variable width data field in an embodiment of the present invention.

DESCRIPTION OF THE PREFERRED EMBODIMENT

As previously stated this invention provides means for accessing in parallel, a data bus of variable width and of aligning a data field, also of variable width, on this data bus. The structure described herein includes a number of circuits which accomplish these tasks which are both simple and regular, making them ideal candidates for macro blocks in very large scale integrated circuits. The structure described herein will be referred to as a general bit manipulator.

Figure 1:
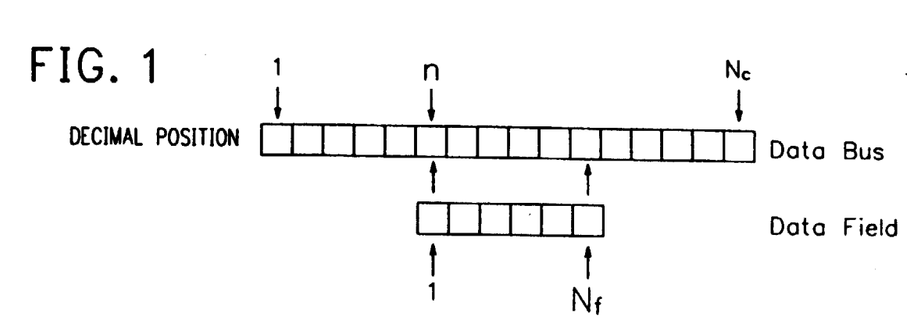
FIG. 1 is a diagramatic illustration of a variable width data bus having a bit position n aligned with the first bit position of a variable width data field, and wherein there are no overflow bits.
Figure 2:
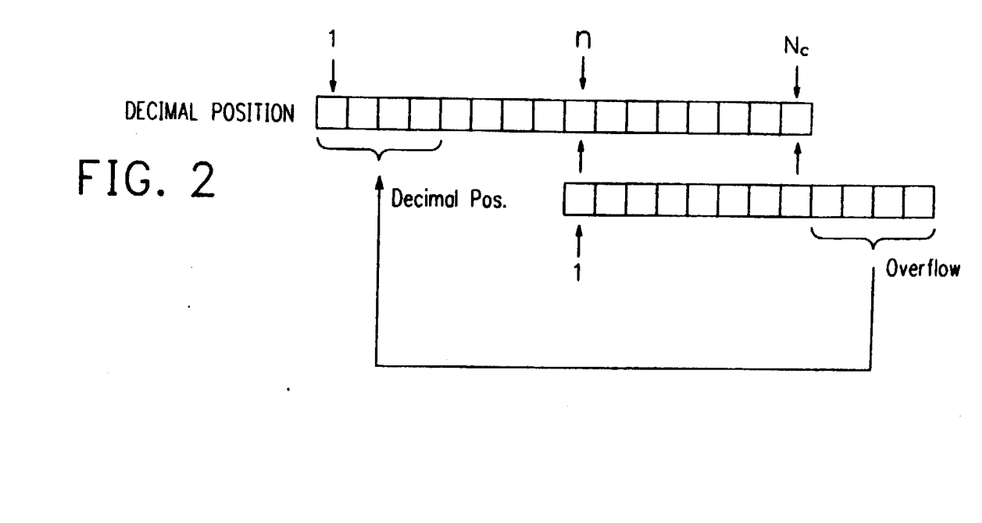
FIG. 2 is a diagramatic illustration of a variable width data bus having a bit position n aligned with the first bit position of a variable width data field, and wherein there are overflow bits.

Referring to FIG. 1, consider a data bus of variable width $N_c$, where $N_c$ ranges from some minimum width $N_1$, to some maximum width $N_m$ ($1 <= N_1 < = N_c < = N_m$). A data field variable width Nf ($1 < = N_f < = N_c$) is to be placed on this bus aligned so that bit 1 of the data field is at bit n ($1 < = n < = N_c$) of the data bus. Given such an alignment, if $N_f > N_c - n + 1$, then $N_f - (N_c - n + 1)$ bits of the data field will extend beyond bit $N_c$ of the data bus resulting in "overflow" bits as shown in FIG. 2. These "overflow" bits are to be "wrapped around" and placed in position 1 through $N_f - (N_c - n + 1)$ of the data bus as shown. In addition as will be later described, special overflow signals are to be generated to accompany these overflow or wrapped bits so that, if necessary, these bits can be subsequently subjected to special processing. Finally select signals must be generated to indicate which bits of the data bus contain valid data. These signals are important when $N_f < N_c$.

The feature of the present invention wherein a variable width data field is aligned with a variable width data bus such that a first bit of the data field is aligned with any selected bit within the data bus, and wherein "overflow" bits of the data field are detected and "wrapped around" and placed starting at the beginning first position of the data bus, will be described using a specific application as an example. The general bit manipulator is particularly well suited to bit-buffered display systems for providing high speed, high function text and graphics, and the present invention will be described for such application.

In a bit-buffered display system the displayed information is maintained in a bit-buffer random access memory with each picture element (pel) on the screen represented by one bit in the memory. As the number of pels on the screen is changed from system to system, the individual chips themselves do not change. However, the number of memory chips can be changed in proportion to the number of pels per scan line on the screen.

Graphical data is entered into the memory one bit at a time. The organization and typical speeds are such that this can provide a complete screen rewrite in about one-third of a second or faster, which is more than adequate For a number of text applications, writing of one bit at a time is not adequate since excessive flicker will be encountered. The system to be described provides for writing of one bit per chip (for any given memory bank) and will normally have anywhere from 8 to 16 chips per bank. Thus, up to 8 or 16 bits respectively can be written. For a given system using $N_c$ chips, any number of bits from 1 to $N_c$ can be written in parallel. This allows any size font of up to $N_c$ pels in the X direction for different character sets to be accommodated. Characters can start at any X Y position on the screen with much of the positioning, wrapping, and incrementing being done by the memory chip hardware working in conjunction with the function generator.

Figures 3, 32:
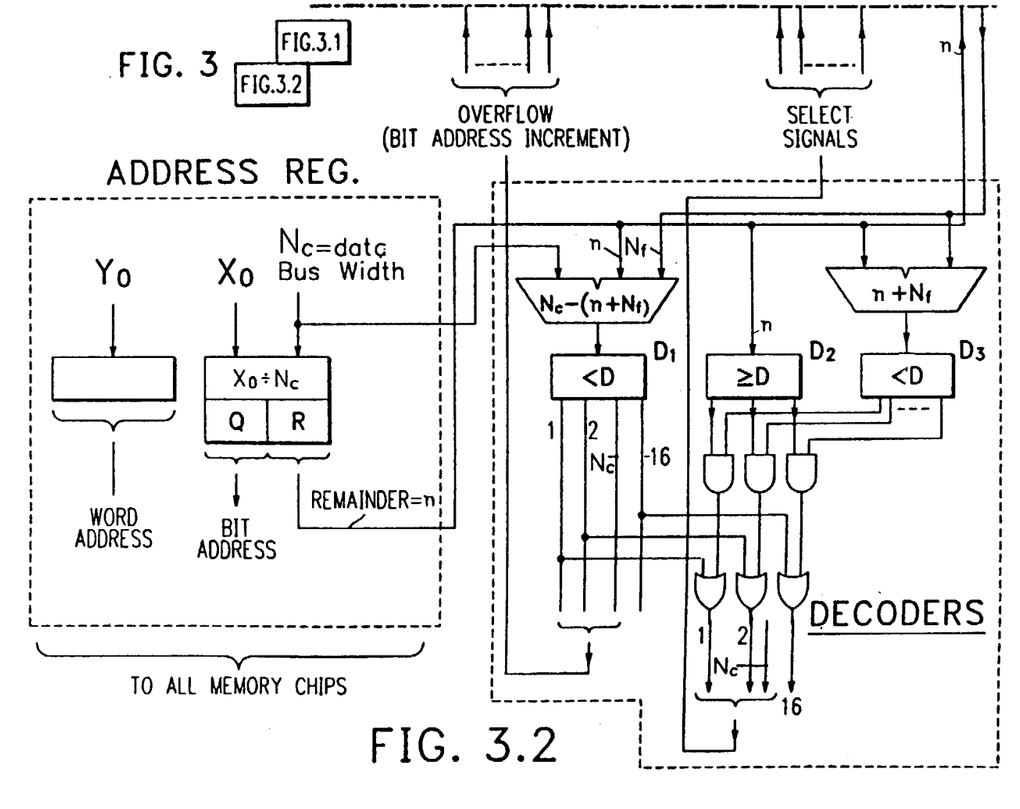

The overall organization of the memory and the bit manipulator within the display system is shown in FIG. 3. Each memory bank has a depth of $N_c$ chips where $N_c \leq N_m$. A bank of memory stores one bit per pel for some attribute of a display "plane." For black and white, a bank would store the "on" or "off" information. The system is architected for a maximum bank depth of $N_m$ chips where $N_m$ is typically 16 (other values such as 32 are easily possible). A bank can contain, at most, as many bits as there are pels on the maximum sized screen allowed in the system. Fewer chips, namely $N_c < N_m$ are easily accommodated for smaller numbers of pels per line, as will be seen.

In this organization, one data line is connected to each chip for writing data into the chip. A separate line is used for read-out. An X scan line of the display screen (not shown) is stored as sequential bits. These are read-out for scanning in the following way. In the more simple embodiment each word consists of 4 segments, each of 64 bits in length. For refreshing the display screen, 64 bits are read out into either one of two shift registers on each of the $N_c$ chips. These $N_c$ registers in turn are connected to a master display screen refresh register.

For writing of a character into the bit map, the starting coordinates $X_o Y_o$, the font of length $N_f$ in the X direction, and the character data for that line are given. For this case the entire font character field is to be written with no other information superimposed; i.e., $N_f$ chips are to be written directly from the ROM character generator. $N_f$ can be a maximum of $N_c$, the number of chips in the bank, thus insuring that no more than one bit is written per chip. It is further assumed that the area outside the font field is left unchanged, i.e., chips 1 to (n−1) and chips (n−1+$N_f$) to $N_c$ in FIG. 1 are not changed. For the general case when $N_f < N_c$, $N_c < N_m$ and the character wraps around the edge, (the "overflow" and "wrap around" feature) there are three fundamental operations that must be performed.

1. Data alignment: Data in the X direction from the ROM character generator for that font must be aligned to the proper chip starting position.
2. Bit-address incrementer: When the character wraps around the edge of the "bank depth," i.e., beyond chip $N_c$, it is necessary to increment the bit address of the subsequent chips by 1.
3. Chip select: Only the $N_f$ chips must be selected starting with n.

It must be noted that the system was designed for modulo $N_m$ and it is now being operated at modulo $N_c$. Initially, the user will specify a value of $X_o Y_o$ from 0 to a maximum of 1023 for a full system. For any case in which $N_c$ is less than or equal to 16, it is necessary to perform one division for each new value of $X_o$. This division will be done by the microprocessor and is used to determine n as follows.

$$(X_o/N_c) = Q + R$$

where Q is the quotient and R is the remainder. $Q+1$ will be the bit address on a chip and R is the value of n that is used to determine which of the $N_c$ chips is addressed and receive overflow signals. All remaining modulo $N_c$ partitioning of bits onto the appropriate chips is done with simple hardware. For purposes of implementing the logic functions later, it is assumed that $X_o$ is the binary address of the pel on a line, from 0 to 1023, where a binary address of 0 means the first pel. However, the values of $N_f$, $N_c$ and $N_m$ will be the actual number of pels/font, or number of chips coded in binary. In other words, 12 chips will be entered as binary 12, but the 12th chip will have an internal binary address of 11.

The above three functions for parallel character data insertion can be accomplished in software, using general register hardware with instructions, as is done today for less exotic systems. However, substantial improvements in speed and performance can be obtained by using special-purpose, on-chip hardware. Since this hardware will be used a large percentage of the time, it is reasonable to include it on-chip.

DATA ALIGNMENT

Figure 5:
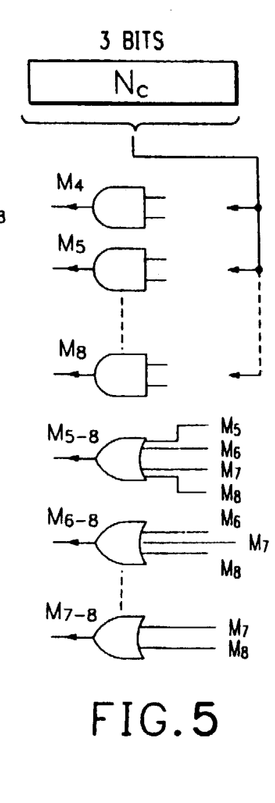

This can be achieved by using a modulo $N_c$ combinatoral ring shifter as shown in more detail in FIGS. 4 and 5 which show such a shifter for a maximum data width of $N_m=8$ and a minimum of 4; i.e., $N_c$, which equals the modulus, can range from 4 to 8. For any given value of $N_c$, the number of shifts is less than or equal to $N_c-1$. Such a shifter can be designed to handle any modulo (i.e., any number of chips) from the smallest value of $N_f$ up to $N_m$. The actual number of chips, $N_c$, used in any given display system is assumed to be stored in a register or have 4 to 5 address lines with the correct d.c. value of $N_c$ (in binary) to supply the inputs to the modulus control gates as shown. FIGS. 4 and 5 only show the logic for bits 1, 2 and bit 5, respectively The remainder can easily be derived by studying these cases. Other architectures would specify the maximum ($N_m$) and minimum number of chips, and hence the range of $N_c$. It can be seen that for many architectures of interest, i.e., 16 chips maximum, the ring shifter ranges from a few hundred to a thousand gates, which is quite reasonable. For $N_m=32$ chips, the required number of gates, about 6500, is excessive and would require special design.

The data shifter will be located on the data generator chip. Each bit of its output supplies data to one chip in a memory bank as shown in FIG. 3. For any given Y value (screen line number), the $N_f$ bits of character data in the X direction will be read from the ROM for that font; these bits will be assumed to start at bit position 1 of the data register. They are ring shifted the correct amount to start at bit position n and any required wrapping around the end would automatically be provided, and for any given value of $N_c$.

OVERFLOW SIGNAL GENERATOR (BIT-ADDRESS INCREMENTER)

Figure 6:
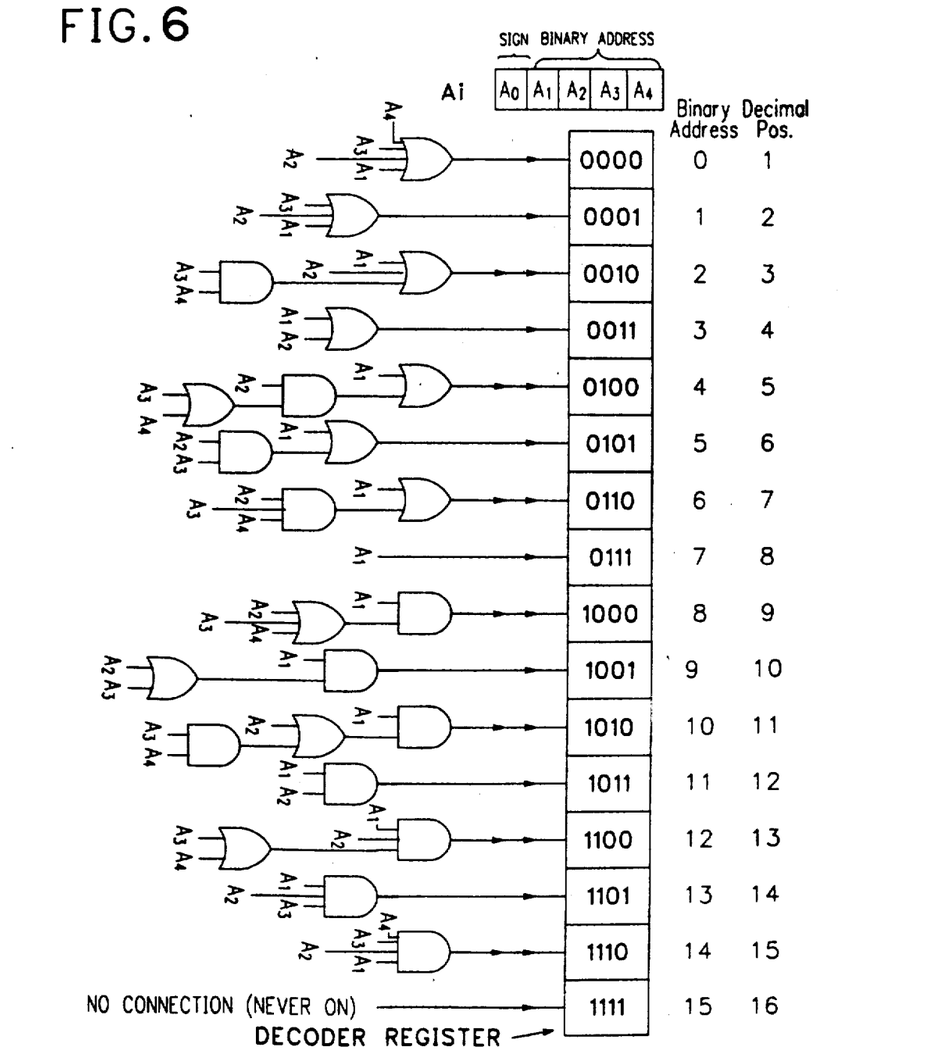
FIG. 6 is a schematic diagram of a "less-than" decoder circuit used in an embodiment of the present invention.

This function must first detect if a wrap or overflow condition actually exists. It if does, then all the "wrapped" bits on all chips beyond $N_c$ must have their bit-addresses incremented by one. The first part of this function, namely determining if a wrap condition is necessary and which chips are to be incremented, is done on the function generator chip by the "less than" decoder circuit of FIG. 6 while the actual incrementing of the bit-address is done on each memory chip. This hardware makes use of a very simple algorithm, given the starting position binary address, n, the font length in X direction, $N_f$ and the number of chips per bank, $N_c$. First the function generator must perform a simple subtraction, namely, $A_I=N_c-(n+N_f)$. In 2's complement notation, the above is an addition of 3 numbers. For a system designed to accomodate a maximum of 16 chips, i.e., $N_m=16$, $A_I$ will be 5-bit number stored in some register, as shown in FIG. 6, with the highest order bit being the sign of $A_I$ in 2's complement notation. If $A_I$ is positive (sign=0), then $n+N_f$ is smaller than or equal to $N_c$ and no wrapping occurs. The sign bit acts as a control to inhibit further decoding of the binary value of $A_I$. If $A_I$ is negative (sign=1), then wrapping occurs and the binary value of $A_1$ specifies the number of chips, from 1 to $A_1$ (or binary address of 0 to $A_I-1$) that must be incremented. The sign=1 bit enables the decoder of FIG. 6, which puts a 1 in all register positions with binary values from 0 to $A_I-1$, and 0's in all other positions from $A_I-1$, and 0's in all other positions from $A_I$ to binary 15. Note, if $N_c<N_m$, we will still have 16 bits in the register, but positions $N_c+1$ to $N_m$ will not be connected to any chips.

The decoder circuit of FIG. 6 is used in other functions later. Therefore, it is given the name, Less-than Decoder (<Decoder), since it is a decoder that produces outputs at all addresses less than the binary input address $A_I$ (an ordinary decoder would produce one output only for $A_I$).

The logic circuitry described in FIG. 6 would be on the function generator chip. The bit-address increment register only specifies which chips are to be incremented. The actual incrementing of the bit address is done on each memory chip by the simple half adder/-carry propagate circuit shown in FIG. 6. Only one such circuit is required on each memory chip since all chips require, at most, a one-bit increment. The circuit would be identical for all chips.

Figure 7:
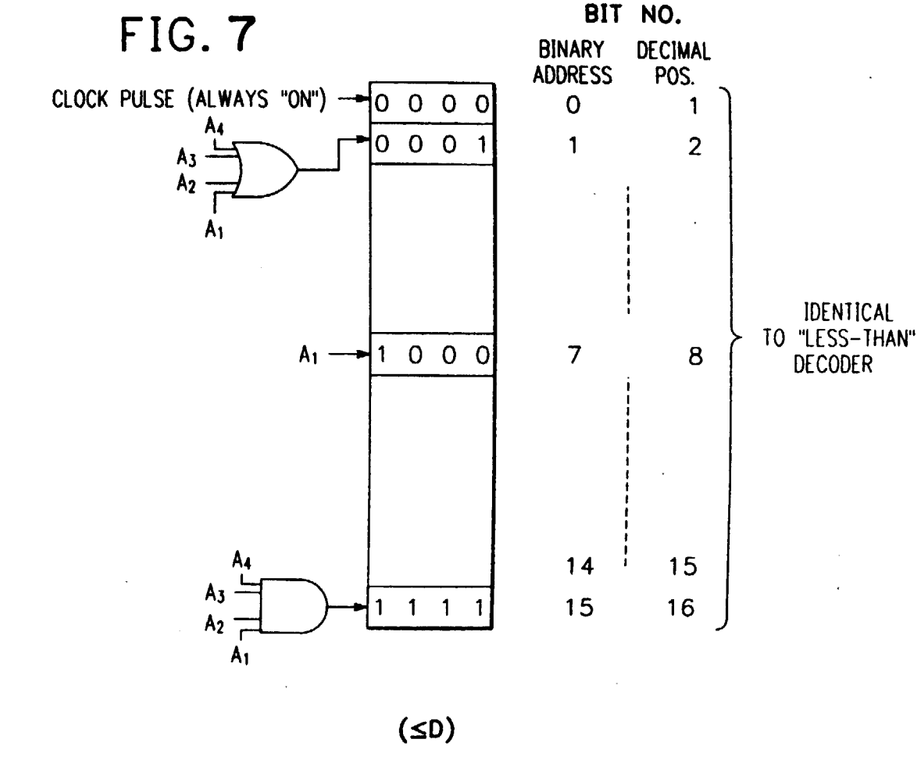
FIG. 7 is a schematic diagram of a "less-than or equal to" decoder circuit used in an embodiment of the present invention.
Figure 8:
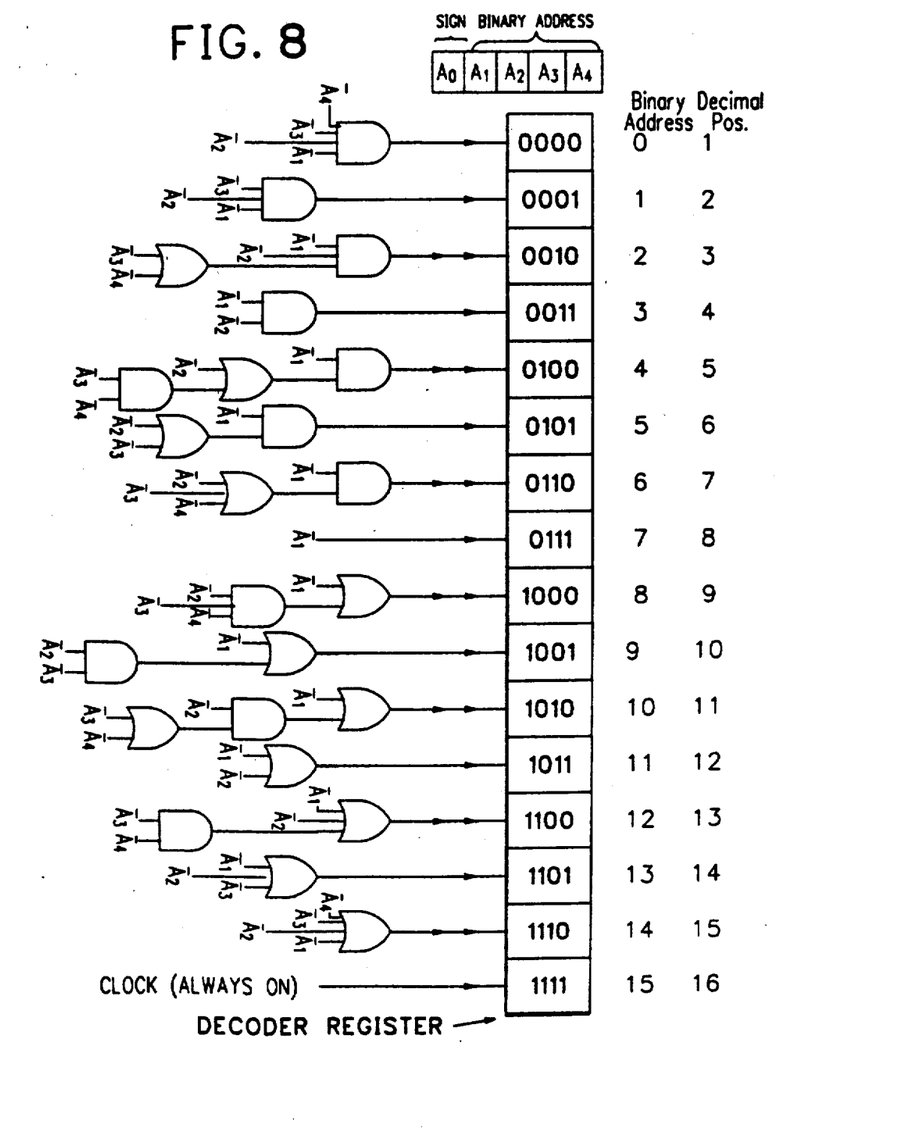
FIG. 8 is a schematic diagram of a "greater-than or equal to" decoder circuit used in an embodiment of the present invention.
Figure 9:
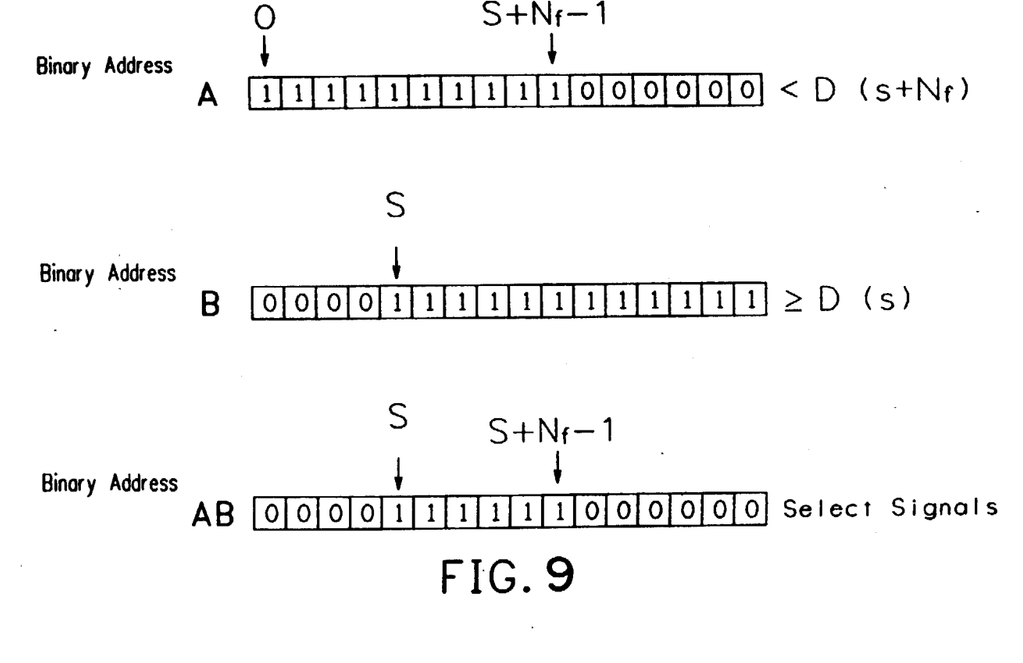
FIG. 9 is a diagramatic illustration for explaining the generation of select signals for the case of no overflow bits.
Figure 10:
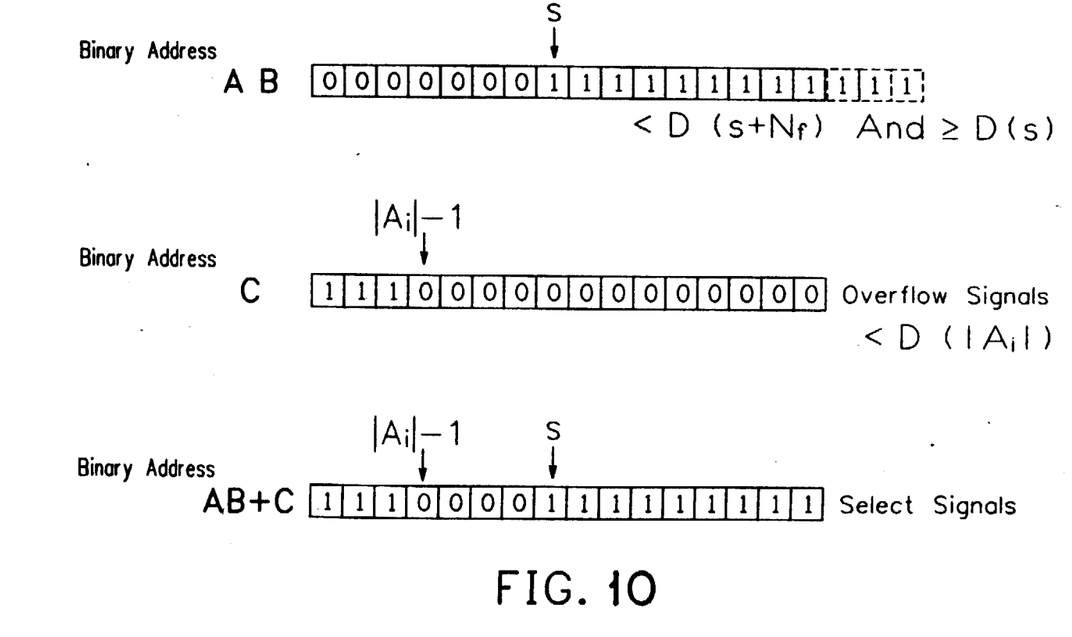
FIG. 10 is a diagramatic illustration for explaining the generation of select signals for the case with overflow bits.
Figure 11:
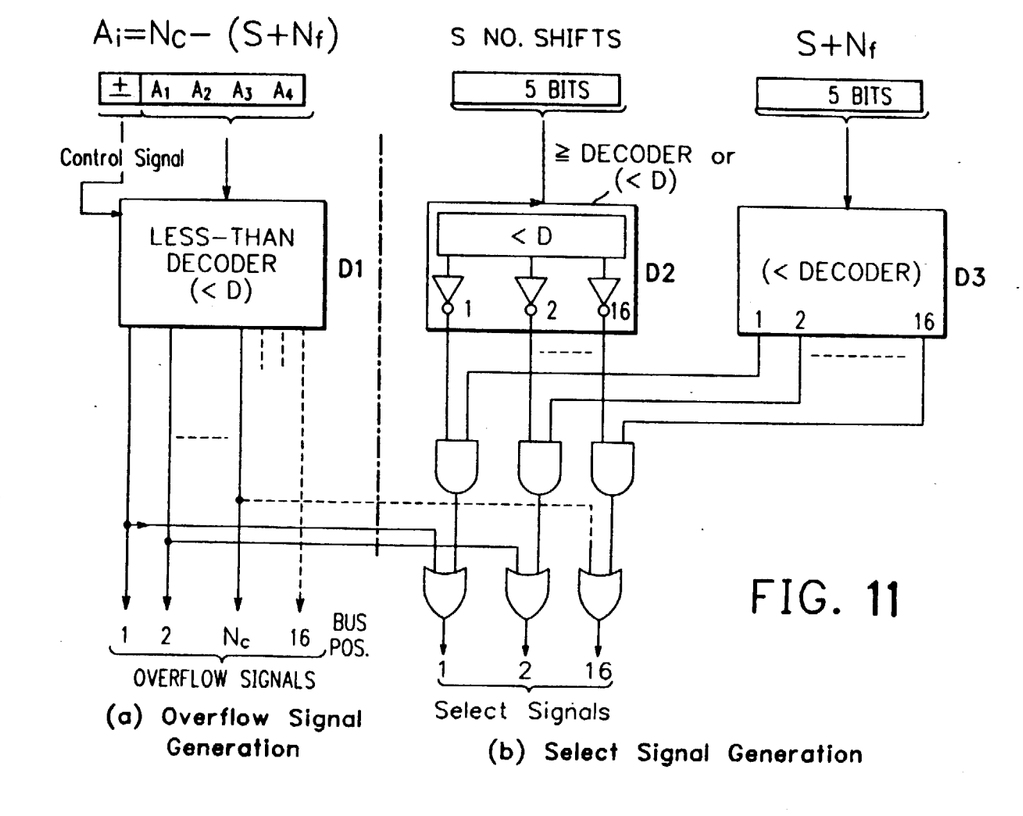
FIG. 11 is a schematic block diagram illustrating the generation of bbth overflow and select signals.
Figure 31:
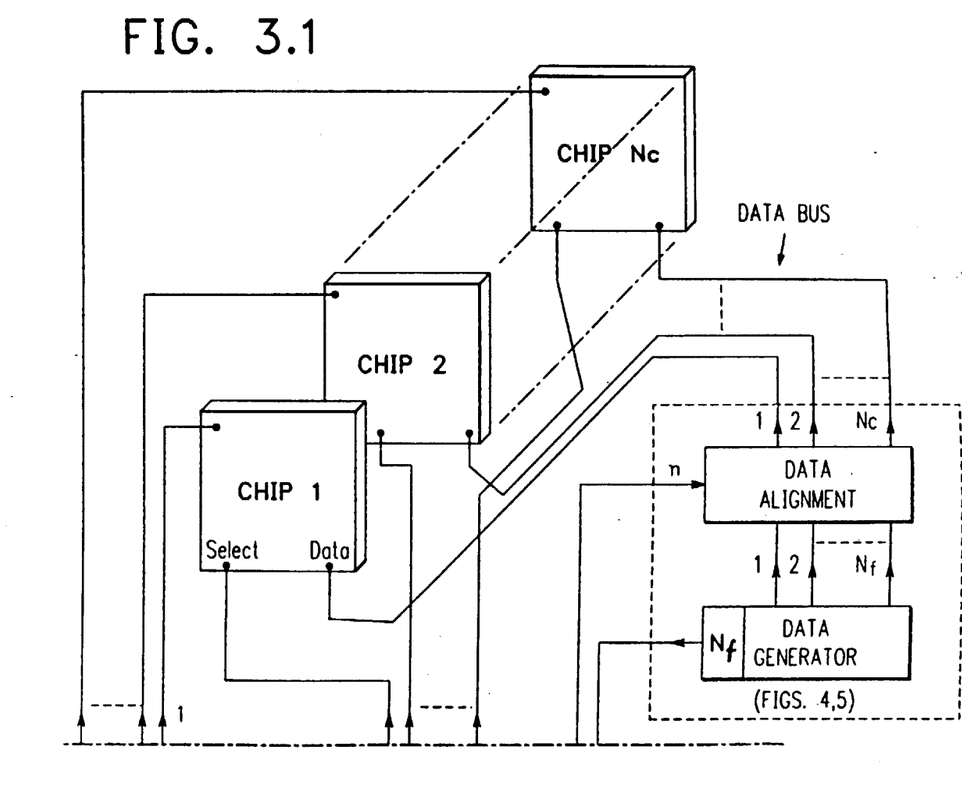
Figure 41:
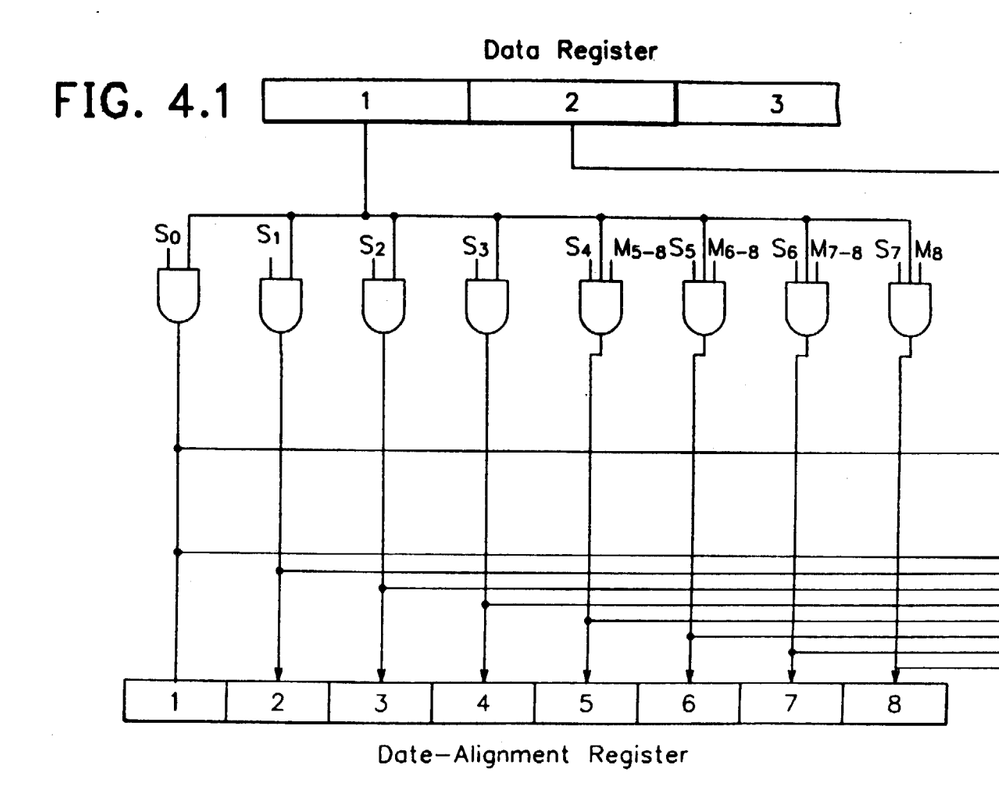
Figure 42:
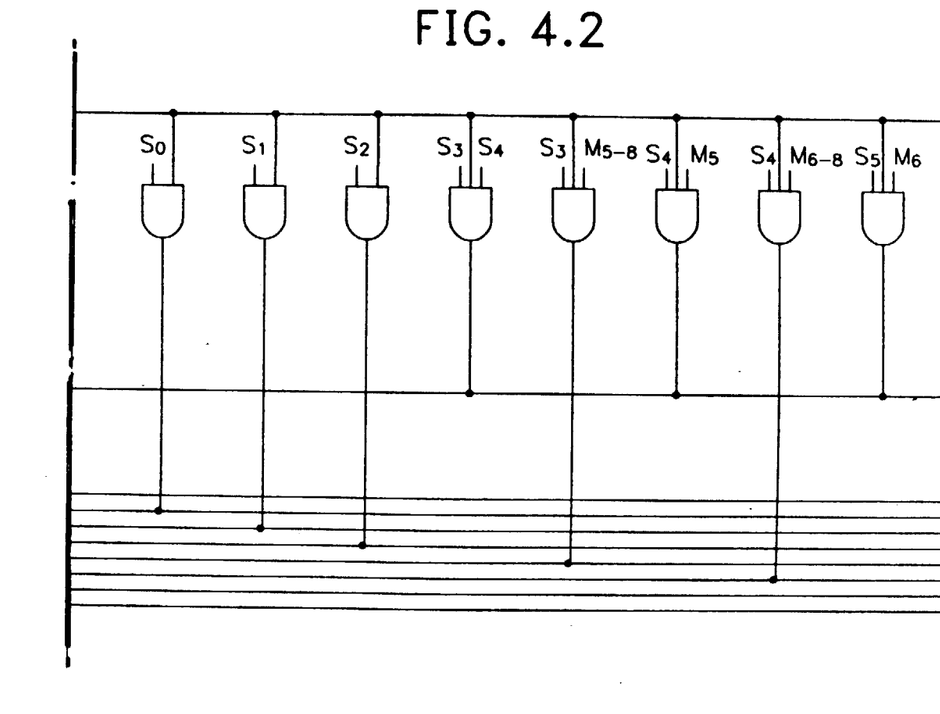
Figure 43:
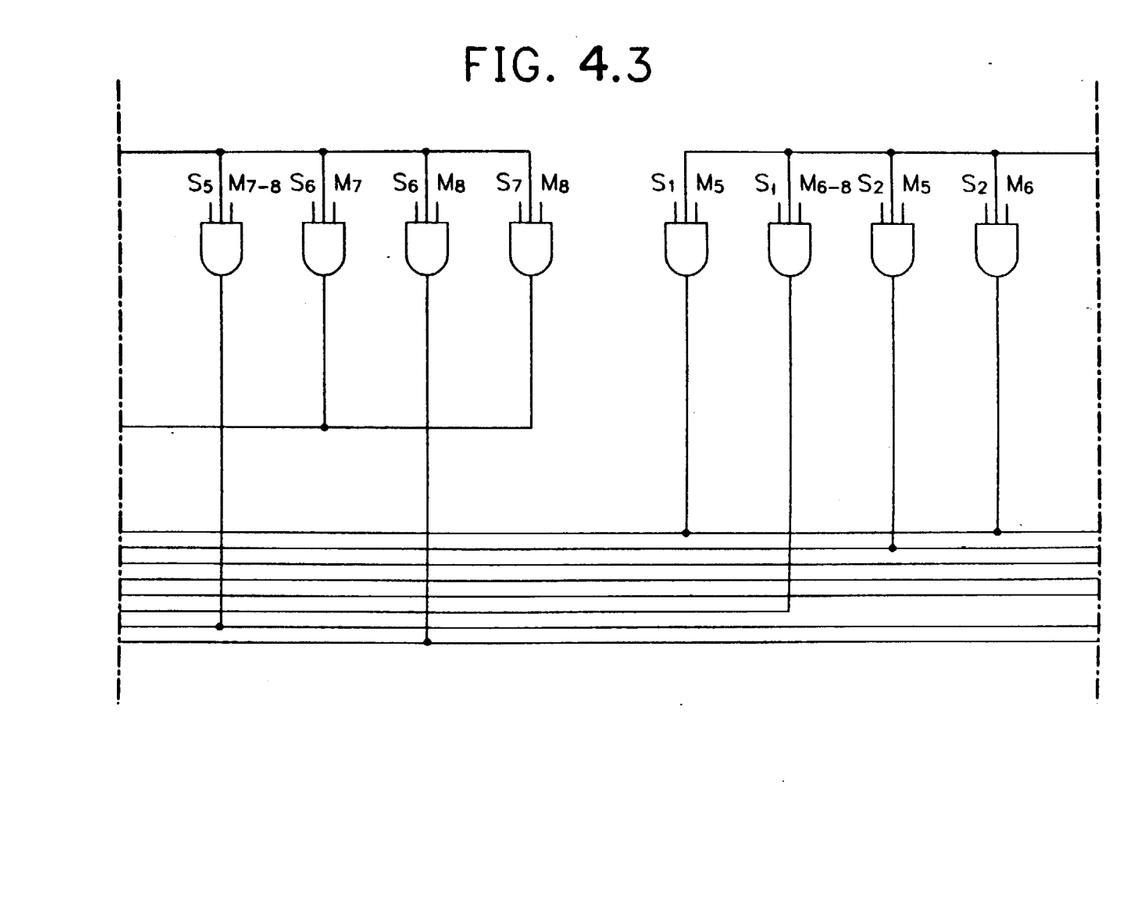
Figure 44:
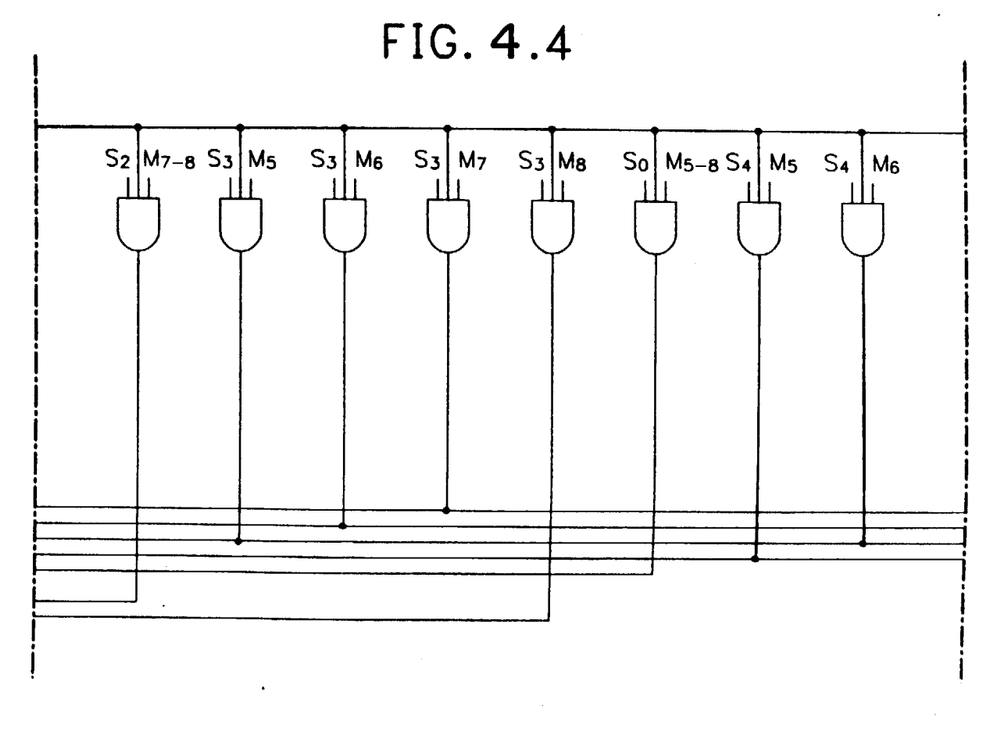
Figure 45:
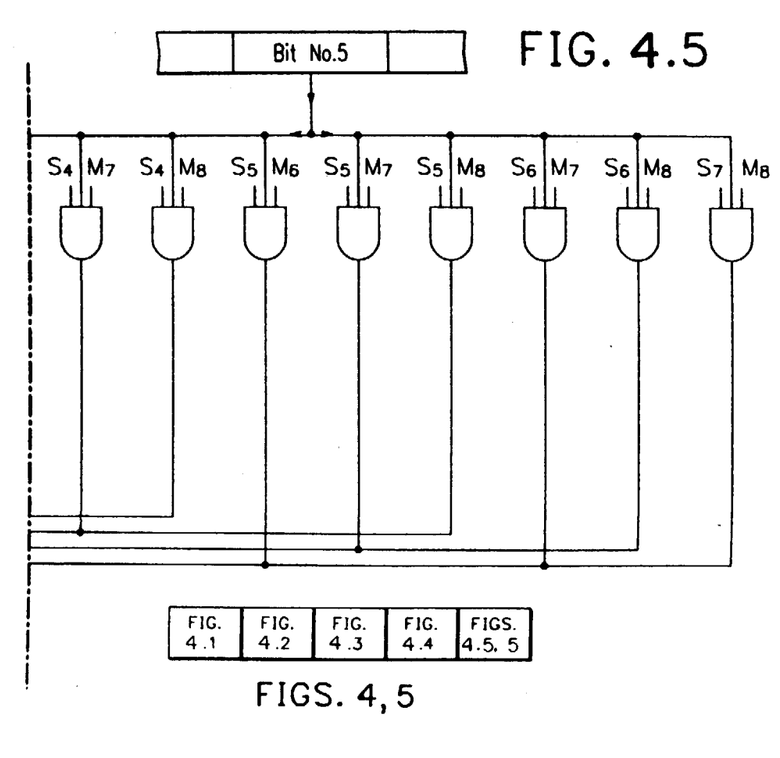

There are two other related decoders that are used later in the chip-select funtion. One is the Lessthan/Equal Decoder of FIG. 7, which is just the decoder of FIG. 6 with all inputs connected one bit position lower on the output positions. For any given binary address $A_J$, the output bit positions will have 1's for all positions less than or equal to A with 0's in all other positions. The second related decoder is the Greater-than/Equal Decoder of FIG. 8. This decoder places 1's in all bit positions greater than or equal to the input address. It can be obtained either by simply inverting the outputs of the Less-than Decoder of FIG. 6, or alternatively, it can be obtained by complementing the total input function to each position, i.e., change all AND's to OR's, all OR's to AND's and use complemented inputs as shown in FIG. 8.

SELECT SIGNAL GENERATOR (CHIP SELECT)

The data-in register in FIGS. 3 and 4 will contain a 1 or 0 for every chip position in the bank. If the entire register was to be written into memory, the entire field of width $N_c$ would be written. Since the regions outside $N_f$ should be left undisturbed, the chip select signals must be turned on only for $N_f$ chips, starting at n. There are two general cases, namely the "no-wrap" case and the "wrap" case. These two cases require separate chip select signal conditions. The "no-wrap" case can be implemented by the superposition of two decoders similar to that of FIG. 6 as follows. First produce a string of "1" bits from chip position 1 to $n+N_f$ (binary address 0 to $n+N_f-1$). This is done with a Less-than Decoder identical to FIG. 6. Next a Greater-than/Equal Decoder (FIG. 8) is used to produce a string of 0's from address 0 to $n-1$. These two decoders are ANDed together to produce the chip select function for the "no-wrap" case.

In general, there will be wrapping so the chip select function must include both cases. This is easily accommodated by ORing the above chip select signals for "no-wrapping" with the bit-address increment bits previously generated.

The generation of both the bit-address increment signals and the chip-select signals is shown schematically in FIG. 3 relative to the "less than", "greater or equal to" and "greater than" decoders. All of these circuits would be on the function generator chip. Note that the three decoders are built from the same basic unit, namely that of FIG. 6; hence, this serves as a convenient macro that has additional applications. The circuit count of such a decoder is approximately one and one-half times that of a simple one-out-of N decoder. For the intended application, these decoders would be quite small, on the order of 32 to 64 logic gates each. The Less-than Decoder must decode $n+N_f$ which can be 5 bits but still only 16 outputs. An additional input will be necessary, but easily provided, for turning on all bits when $n+N_f$ is greater than 16.

In some cases, it may be desirable to overwrite a black-and-white character and leave the entire background unchanged. Normally this would require some processor generated masking operations. However, such an overwrite can be done in a very simple manner with the proposed organization. The character data from the ROM, after data alignment, becomes the chip select signals as well, so only the actual character pels are changed and no masking operations are required. All that is required is a selector switch to provide a data path from the data-in lines to the chip-select lines in the function generator or, optionally, on each memory chip.

Having thus described our invention, what we claim as new, and desire to secure by Letters Patent is:

1. In a data processing system including a variable width data bus for the parallel transmission of data in variable width fields or blocks between units in the data processing system, a logic circuit combination for placing a variable width data field having a number of bits from a first bit up to a last bit $N_f$ on a single variable width data bus comprising:

means for aligning the first bit of a given one of said variable width data fields having a number of bits, $N_f$, with a selected bit position n of a single data bus of width from a first bit position up to last bit position of number $N_c$, where $N_f$ is any integer number of bits from 1 up to and including the number $N_c$, where n is any bit position within the data bus width $N_c$, and where $N_c$ is the last bit position, and means for determining whether the number of bits, $N_f$, of said data field is greater than, equal to, or less than the number of bit positions between selected bit position n and last bit position $N_c$, means responsive to said determining means for generating select signals indicating which bit positions of said data bus contain valid data bits when the number of said bits, $N_f$, of said data field placed in said data bus is less than the number of bit positions between n and $N_c$, means responsive to said determining means for generating overflow signals indicating which bits of said data field remain beyond the bits placed in bit positions n to $N_c$ of said data bus when the number of bits, $N_f$, of said data field is greater than the number of bit positions between n and $N_c$, the amount of said data field bits in excess of the bits aligned between n and $N_c$ beyond these aligned up to $N_c$ being $N_f=(N_c-m+1)$, and means responsive to said determining means and said overflow signals for placing said $N_f=(N_c-n+1)$ bits of said data field beyond bit position $N_c$ of said data bus into the first bit position of said data bus up to the $N_f-(N_c-n+1)$ bit position of said data bus.

2. A data processing system according to claim 1 wherein said means of aligning the first bit of a given one of said variable width data fields includes an externally selectable combinational ring shifter circuit having a modulus equal to said data width $N_c$, said ring shifter circuit responsive to said $N_f$ data field bits to shift said $N_f$ data field bits to align said first of said $N_f$ bits with said n bit position of said data bus.

3. A data processing system according to claim 2 wherein said means for determining whether the number of bits, $N_f$, of said data field is greater than, equal to, or less than the number of bit positions between bit positions n and $N_c$ includes a first decoder circuit for performing a subtraction function $N_c-(n+N_f)$.

4. A data processing system according to claim 3 wherein said overflow generating means and said means for placing said $N_f-(N_c-n+1)$ bits of said data field beyond bit position $N_c$ of said data bus into the first bit position of said data bus up to the $N_f-(N_c-n+1)$ bit position of said data bus includes second and third decoder circuits having outputs which are connected together by AND logic circuits and are connected to the output of said first decoder circuit by OR logic circuits.

5. A data processing system according to claim 4 for application as a text display system further including a plurality of memory banks each including $N_c$ memory storage chips connected to said data bus.

* * * * *